United States Patent Office 2,752,339
Patented June 26, 1956

2,752,339

PREPARATION OF CORTISONE

Percy L. Julian, Maywood, John Wayne Cole, Oak Park, and Edwin W. Meyer and William J. Karpel, Chicago, Ill., assignors to The Glidden Company, Cleveland, Ohio, a corporation of Ohio No Drawing. Application September 9, 1950,
Serial No. 184,124

29 Claims. (Cl. 260—239.55)

The present invention relates to the preparation of 4-pregnene-17α,21-diol-3,11,20-trione and its 21-monoacetate, generally known as cortisone and cortisone acetate, respectively.

The name "cortisone" has been given to the compound previously known as "Kendall's Compound E," which is 4-pregnene-17α,21-diol-3,11,20-trione. The discovery by Kendall and his coworkers that cortisone is beneficial in the relief of the symptoms of rheumatoid arthritis greatly stimulated research on the partial synthesis of this material from other steroid raw materials. These partial syntheses involve degradation of the side chain of sterols, bile acids and steroid saponins to an acetyl group, introduction of a 17α-hydroxy group, introduction of a 21-hydroxy or acyloxy group, introduction of an 11-keto group, conversion of a 3-hydroxy group to a keto group, and formation of a 4,5 double bond where this is not already present. Processes are known whereby each of these results may be achieved. However, there is a multiplicity of steps involved, the overall yield is, of course, low, and in all cases consideration must be given to the particular reactions being carried out in the light of the various functional groups present.

The present invention is not concerned with the introduction of the 11-keto group, nor with the formation of the acetyl group in the 17-position of the molecule, but is concerned with the other conversions and reactions mentioned.

It is accordingly an object of the present invention to provide a novel process for the manufacture of cortisone.

Another object of the invention is to provide a process for producing cortisone from 10,13-dimethyl-3-hydroxy-11,20 - diketocyclopentanopolyhydrophenanthrene compounds of the C-21 series.

A further object of the invention is to provide a series of reactions useful in the production of cortisone.

An additional object of the invention is to produce new compounds useful for producing cortisone.

Other objects will be apparent to those skilled in the art from the following description:

A fundamental aspect of the invention is the use of 16,17-oxido-pregnan-3α-ol-11,20-dione for the manufacture of cortisone. This oxido compound may conveniently be made by treatment of 16-pregnen-3α-ol-11,20-dione with a suitable epoxidizing agent such as perbenzoic acid, or more conveniently with alkaline hydrogen peroxide.

The conversion of the 16,17-oxido-pregnan-3α-ol-11,20-dione into cortisone involves the following reactions: (1) the conversion of the 16,17-oxido group to a 17α-hydroxy group by treatment with HBr, followed by removal of the 16-bromo group thus introduced by treatment with Raney nickel; (2) introduction of a 21-acyloxy group by first brominating to introduce a 21-bromo group, followed by treatment with a metal salt of a carboxylic acid, such as sodium or potassium acetate, formate, benzoate, etc., to replace the 21-bromo group with an acyloxy group; (3) oxidation of the 3α-hydroxy group to a keto group; and (4) introduction of a 4,5-double bond by first brominating a 3-keto compound at the 4-position, followed by removal of HBr. It is not essential that the various reactions or steps be carried out in the order recited, but in some cases certain of the reactions must take place subsequent to others. Thus considerable flexibility is inherent in the overall procedure, as is shown by the flow sheet and as will be more fully explained.

PREPARATION OF 17α-HYDROXY COMPOUNDS

The 16,17-oxidopregnan-3α-ol-11,20-dione may be prepared from 16-pregnen-3α-ol-11,20-dione, which may in turn be prepared as described in co-pending application Serial No. 152,752, filed March 29, 1950, by treatment of the pregnene with epoxidizing agents such as perbenzoic acid, or, preferably, by treatment with alkaline hydrogen peroxide, as is more fully disclosed in co-pending application Serial No. 165,120, filed May 9, 1950.

The first step in the conversion of the oxido group is the treatment of the oxido compound with HBr, which results in the production of a 16-bromo-17α-hydroxy-bromhydrin. The treatment with HBr may take place at any stage of the process at which the oxido group is present. The oxido group is restored when the α-bromhydrin structure is subjected to an alkaline treatment. Thus, treatment of the 21-bromo compound with the metal salt to introduce the 21-acyloxy group will inherently restore the oxido group where the bromhydrin grouping is also present. Also, in some instances it may be desirable to deliberately restore the oxido group by a mild alkaline treatment, since the oxido compounds are generally high-melting materials and readily crystallized. Also, since the presence of a 17α-hydroxy group is preferred for introduction of the 21-bromo group, as will more fully appear, it will be apparent that the opening up of the oxido group and its restoration may in some cases be advantageous. Of course, ultimately the conversion of the oxide to the bromhydrin and removal of the 16-bromo group must be brought about.

The 16-bromo group may be removed at any stage in the process up to and including the last step in the formation of the cortisone acetate. The treatment with Raney nickel, however, would remove a 21-bromo group, if present, and as no useful purpose would be served by such removal, the treatment with Raney nickel of a 21-bromo compound is ordinarily to be avoided.

INTRODUCTION OF THE 21-ACYLOXY GROUP

The first step in the introduction of the 21-acyloxy group is the treatment with bromine. The presence of the 17α-hydroxy group is essential to the introduction of the 21-bromo group. If an oxido compound is treated with bromine, some HBr will be formed which will open up the oxide ring, and introduction of a 21-bromo group will follow. However, such a procedure leads to difficultly separable mixtures and low yields and is to be avoided for best practice.

The bromination may be carried out in a variety of solvents. When a solvent such as acetic acid, or other acylating mixture, is used, the 3-OH group will, of course, be acylated, and when the use of such a solvent is contemplated for the bromination, it is preferred to first acylate the 3-OH group before brominating. However, non-acylating solvents such as carbon tetrachloride, chloroform, and the like, may be employed.

The replacement of the 21-bromo group by an acyloxy group is effected by treatment with a metallic salt of a carboxylic acid, such as potassium or sodium acetate,

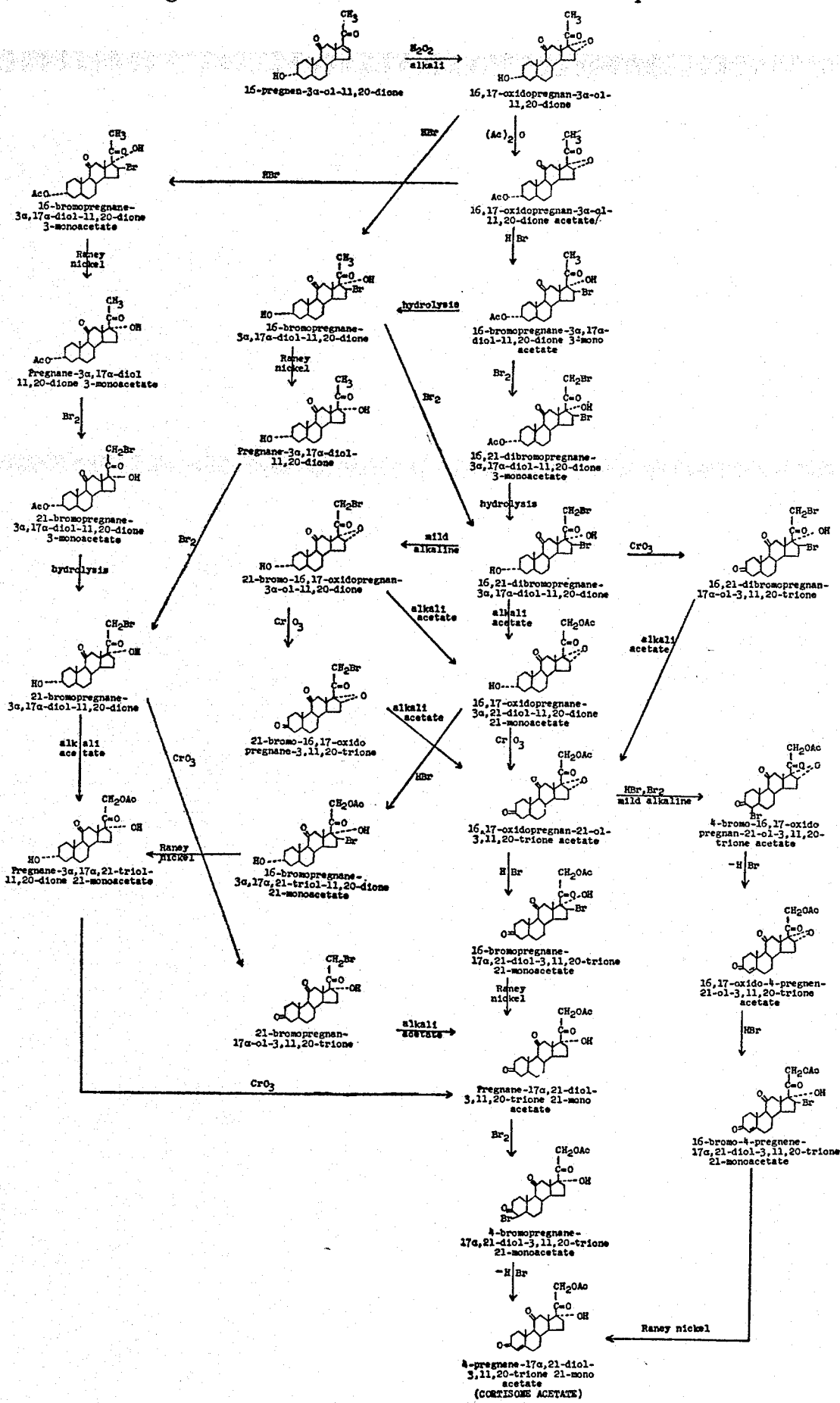

formate, benzoate, etc., in acetone, acetic acid or other suitable solvent, as is more generally described in copending application Serial No. 143,146, filed February 8, 1950. The introduction of the 21-acyloxy group may be carried out on a 17α-hydroxy compound, either before or after removal of the 16-bromo group, or on an oxido compound. If it is carried out on the bromhydrin, the oxido group will be restored due to the alkalinity of the salt. Thus, when treating a bromhydrin, it may be desirable to first subject it to a mild alkaline treatment before reaction with the salt to first restore the oxido group.

The replacement reaction to introduce the 21-acyloxy group may be carried out on either the free 3-OH compound or the 3-keto compounds. The reaction will take place also with 3-acyloxy compounds. However, since a free 3-OH group is required for the oxidation step, it is preferred that any 3-acyloxy groups to be hydrolyzed prior to the treatment with the salt in order to avoid the necessity of a preferential hydrolysis at the 3-position or a complete hydrolysis followed by preferential acylation at the 21-position. The introduction of the 21-acyloxy group should, however, be carried out prior to the introduction of the 4,5-double bond.

PRODUCTION OF THE 3-KETO COMPOUNDS

The oxidation of the 3α-hydroxy group to a keto group is preferably carried out with chromic acid. The preference for the use of chromic acid is based upon the discovery that a 3α-hydroxy group is very easily oxidized with chromic acid and that this oxidation can readily be carried out without the cleavage of the side chain at $C_{17}C_{20}$, such as occurs when attempts are made to oxidize a 3β-hydroxy group of compounds possessing the ketol structure of 17-hydroxy-20-keto steroids with $CrO_3$. Due to the greater ease with which the 3α-hydroxy group is oxidized with chromic acid, it is possible to effect this preferential oxidation, but the caution should be observed of minimizing the time of contact of the 3-keto oxidation product with the oxidizing agent, since prolonged and severe treatment with chromic acid would destroy the side chain. To this end the oxidation is preferably carried out in a two-phase system, that is, the substance to be oxidized and the product are in a separate phase from the oxidizing agent. Good results, however, can also be obtained by precipitation of the product quickly, such as by addition of water to the reaction mixture, with or without seeding.

The oxidation step should be carried out subsequent to the introduction of the 21-bromo group, but may be carried out on either a 21-bromo compound or a 21-acyloxy compound. It may be carried out on either a bromhydrin or after the removal of the 16-bromo group. It may also be carried out on an oxido compound.

Obviously the oxidation step must be carried out on a compound having a free 3-OH group. Thus if the starting material possesses a 3-acyloxy group or if one has been formed in some previous step in the overall process, it must be hydrolyzed prior to the oxidation reaction.

THE INTRODUCTION OF THE DOUBLE BOND

The introduction of the double bond is effectuated subsequent to the formation of the 3-keto group. It consists of two steps; namely, the introduction of a bromine atom at the 4-position followed by removal of HBr, and is also carried out subsequent to the formation of the 21-acyloxy group.

The introduction of the 4-bromo group is done by treatment with bromine. It is preferably carried out on either the bromhydrin or on the 17α-hydroxy compound after removal of the 16-bromo group. It may be carried out on the oxido compound, but here again the HBr formed will cause formation of some bromhydrin. It is therefore preferable when using the oxido compound for introduction of the double bond to first treat with HBr, then bromine, and follow this with a mild alkaline treatment, without isolation of any intermediate, to produce the 4-bromo-oxido compound, which may then be treated to remove the 4-bromo group.

The removal of the 4-bromo group may be brought about by treatment with any suitable dehydrobrominating agent. 2,4-dinitrophenylhydrazine has been found to be a suitable reagent for removal of the 4-bromo group. The hydrazone resulting from such treatment is decomposed by treatment with pyruvic acid. Other dehydrohalogenating agents known in the art may also be used.

It is thus seen that a wide variety of optional procedures may be employed, subject to some limitations in the order of certain of the steps, which limitations have been pointed out above, the flow sheet being illustrative of various optional procedures which may be employed. The following examples are also illustrative of the invention.

EXAMPLE I

*Preparation of 16,17-oxidopregnan-3α-ol-11,20-dione*

(a) In a 3-liter round-bottom flask a solution of 50 g. of 16-pregnen-3α-ol-11,20-dione acetate in 1500 ml. of methanol is cooled to 15° C. and treated with 75 ml. of precooled 4 N sodium hydroxide, and then with continued cooling, 150 ml. of cold 30% hydrogen peroxide is added. This mixture is set in a 5° ice chest for about forty hours. It is then filtered into a 12-liter flask. The paper and residue are rinsed with 75 ml. of methanol and discarded. The filtrate is diluted with 5 liters of filtered salt water containing 1 kg. of sodium chloride. The mixture is cooled in an ice bath for one hour to complete the crystallization, and then it is filtered. The filter cake is washed with distilled water, about 3 liters, until the filtrate is neutral, and then dried in a 50° C. oven for about ten hours. The yield is 42 g., M. P. 220–223° C.

(b) A solution of 2.0 g. of $\Delta^{16}$-11-ketopregnenolone acetate was dissolved in 20 cc. of a chloroformic solution containing 2 molar equivalents of perbenzoic acid. The reaction mixture was allowed to stand at room temperature protected from light until titration indicated that 1.2 molar equivalents of reagent had been consumed. The reaction mixture was diluted with ether and washed with 3° sodium hydroxide and finally with water to neutrality. The dried ethereal solution was concentrated to low volume, whereupon 0.57 g. of material melting at 186° separated. This material is the 16,17-oxido lactone. From the mother liquor, there was obtained 0.9 g., M. P. 128–132°, of 16-oxido-11-ketopregnanolone acetate.

EXAMPLE II

*Acetylation of 16,17-oxidopregnan-3α-ol-11,20-dione*

In a 500 ml. flask, 42 grams of the 3-hydroxy oxide of Example I is dissolved in 126 ml. (3 volumes) of distilled pyridine. With cooling, 42 ml. of distilled acetic anhydride is added. This mixture is allowed to stand at room temperature for 12 to 15 hours, and then filtered, if necessary to clarify, into a 2-liter round-bottom flask. A small amount of pyridine is used for rinsing. With ice cooling, water is added in small portions to the filtrate until a total of 336 ml., 8 volumes, of water is used. It is best to seed the mixture at intervals while it is being watered in order to obtain clean crystals. The product is filtered, washed with distilled water and dried. The yield is about 46 grams, M. P. 131–133°, or M. P. 147–149°, depending upon which crystalline form separates. The yield is about 110% by weight or 98% of the theoretical amount.

EXAMPLE III

*Preparation of 16-oxidopregnane-11,20-dione-3α,21-diol 21 monoacetate*

To a 4 g. solution of 16-oxidopregnan-3α-ol-11,20-dione acetate in 40 cc. of acetic acid and 40 cc. of $CHCL_3$ cooled to 20°, there was added 4 cc. of 32% HBr in acetic acid. After allowing to stand for ten minutes, a solution of 1.76 g. of bromine in 18 cc. of acetic acid was added rapidly and the mixture then held at room temperature for 20 minutes until the bromine had been absorbed. The reaction mixture was concentrated in vacuo to a crystalline slush, then slurried with alcohol free ether, chilled and filtered. There was obtained 3.38 g., M. P. 224–230° dec. of the 21-bromo-bromhydrin.

This was treated at room temperature with a mixture of 27 cc. of benzene and 72 cc. of methanol containing 1.9 g. of anhydrous HBr for 12 hours. The reaction mixture was diluted with water and extracted with ether and washed with water to neutrality. The solution was dried and concentrated in vacuo to a crystalline residue which was then dissolved in 90 cc. of dry acetone and refluxed with 15 g. of anhydrous potassium acetate for 5 hours. The mixture was concentrated to low volume, precipitated with water and filtered. The dried product, after crystallization from ethanol, afforded 1.78 g. of 16-oxidopregnane-11,20-dione-3α,21-diol-21-monoacetate, M. P. 230°. Recrystallization from ethyl acetate raised the melting point to 234–235°.

*Anal.*—Calcd. for $C_{23}H_{32}O_6$: C, 68.29; H, 7.97. Found: C, 68.00; H, 7.89.

EXAMPLE IV

Oxidation of 16,17-oxidopregnane-3α-21-diol-11,20-dione 21-monoacetate

A mixture of 1.0 g. of 16,17-oxidopregnane-3α,21-diol-11,20-dione 21-monoacetate, 1 ml. of water and 40 ml. of acetic acid was stirred at 25° C. while a solution of 0.25 g. of chromic acid in 1 ml. of water and 19 ml. of acetic acid was added dropwise during twenty minutes. The starting material all dissolved during this addition. After an additional five minutes, 100 ml. of water was added. The resulting clear brown solution was cooled and scratched to crystallize the product, which was then separated by filtration and dried. The yield was 0.57 g. of 16,17 - oxidopregnan - 21 - ol-3,11,20 - trione acetate of melting point 124–127°. Recrystallization from aqueous acetone raised the melting point to 130–131°.

*Anal.*—Calcd. for $C_{23}H_{30}O_6$: C, 68.62; H, 7.51. Found: C, 68.50; H, 7.31.

EXAMPLE V

Preparation of dihydrocortisone acetate (*a*) A solution of 0.5 g. of 16,17-oxidopregnan-21-ol-3,11,20-trione acetate in 2.5 cc. of acetic acid cooled to 18° was treated with 0.5 cc. of 32% HBr in acetic acid for 10 minutes at 18°. The reaction mixture was concentrated in vacuo to a syrup and anhydrous ether added to induce crystallization. The bromhydrin was filtered and dried in vacuo and then stirred and refluxed for 2 hours with 1 g. of standard Raney nickel and 18 cc. of ethanol. Filtration through a bed of filter-aid and concentration to low volume, followed by crystallization from aqueous ethanol afforded dihydrocortisone acetate, pregnane-17α,21-diol-3,11,20-trione 21-monoacetate, M. P. 218°. Crystallization raised the melting point to 228°.

(*b*) In a round-bottom flask with stirrer and dropping funnel, a clear solution of 10 g. pregnane-3α,17,21-triol-11,20-dione-21-monoacetate,
10 ml. water,
50 ml. carbon tetrachloride, and
125 ml. acetic acid, is stirred at 25° C. while a solution of 5 g. chromic acid in 100 ml. water is added dropwise during thirty minutes. Stirring is continued for an additional thirty minutes and then water is added dropwise until about 150 ml. has been added and the product is a crystalline mass in the carbon tetrachloride layer. The mixture is cooled to 10° C. and filtered. The product is washed once with cold 20% acetic acid and then several times with distilled water.

The dried crude product is 8.55 g. of white flakes of melting point about 225–228°. Recrystallization by dissolving in five parts of hot acetic acid, diluting with eight parts of hot water and cooling, gives as first crop, 7.6 g. white flakes, M. P. 230–231°; second crop (by further watering and cooling), 0.4 g., M. P. 227–229°. The optical rotation is $[\alpha]_D^{25}+82\pm2°$ in acetone at about 1% concentration.

EXAMPLE VI

Preparation of 4-bromodihydrocortisone acetate

A solution of 2.02 of dihydrocortisone acetate, M. P. 230°, in 100 cc. of acetic acid containing 0.516 cc. of 0.678 N HBr in acetic acid was treated dropwise with stirring over a period of five minutes with 10.1 cc. of 0.99 N bromine in acetic acid containing 0.41 g. of anhydrous sodium acetate. After addition of the bromine solution, the mixture was diluted with 240 cc. of water and allowed to stand for one hour. The white crystalline material was separated by filtration, washed with 50 cc. of 30% aqueous acetic acid and then 250 cc. of water, and finally dried at about 50° C. The fluffy crystalline solid weighed 1.98 g. and had a specific rotation of +95°, in acetone. A second crop of 90 mg. was obtained from the aqueous mother liquor on standing.

This 4-bromodihydrocortisone acetate may be purified by stirring it with 2.5 times its weight of acetone, diluting this mixture with 5.0 times the weight of anhydrous ether and separating the purified compound by filtration. The specific rotation will be of the order of +98° to 100°.

EXAMPLE VII

Preparation of cortisone acetate

Ten and three-tenths grams of 4-bromodihydrocortisone acetate was dissolved in a mixture of 396 cc. of pure, dry chloroform and 515 cc. of reagent-grade acetic acid. After the addition of 2.16 g. of anhydrous sodium acetate and 4.63 g. of 2,4-dinitrophenylhydrazine, carbon dioxide was bubbled through the mixture for one hour. The orange-red solution was then allowed to stand for fifteen hours under a $CO_2$ atmosphere. At this time the solvents were removed in good vacuo at about 40–50° C. The 2,4-dinitrophenylhydrazone of cortisone acetate may be isolated by filtering the slurry which remains after removing the major portion of the solvents. This deep orange derivative melts at 232–234° C. The solid residue remaining after removal of all solvent was taken up in 426 cc. of dry chloroform and 106 cc. of acetic acid. After the addition of 106 cc. of 80% pyruvic acid, the mixture was blanketed with $CO_2$ and kept at 45±2° C. for forty-eight hours. The mixture was then concentrated to a heavy slurry in good vacuo and diluted with about 250 cc. of dry chloroform. The suspended orange-yellow solid, the 2,4-dinitrophenylhydrazone of pyruvic acid, was separated by filtration and washed well with chloroform. The combined filtrate was washed well with water, dilute sodium bicarbonate solution, then water and dried. The chloroform solution was concentrated to a convenient volume and treated at room temperature for two hours with 10 cc. of pyridine and 10 cc. of acetic anhydride. After decomposition of the excess acetylating agent with water, the chloroform solution was washed successively with dilute hydrochloric acid, water, dilute sodium bicarbonate solution and finally water. The dried solution was concentrated to about 25–50 cc. volume and diluted with 250 cc. of methanol. The red precipitate, the 2,4-dinitrophenylhydrazone of $\Delta^6$-cortisone acetate, which formed on standing, was separated and the methanol solution concentrated to yield the crude cortisone acetate. With the aid of decolorizing charcoal, the crude material was purified by crystallization from acetone. The purified material, 5.5 g. of white crystalline solid, melted at 243–244° and showed an $E_{max}$ of about 16,000, in methanol, at 238 mμ.

EXAMPLE VIII

*Preparation of pregnane-3α,17α,21-triol-11,20-dione 21-monoacetate*

A solution of 10.0 g. of 16,17-oxidopregnane-3α,21-diol-11,20-dione 21-monoacetate in 10 cc. of chloroform at 10° was treated with 1½ molar equivalents of anhydrous HBr in chloroform for 10 minutes. The solution was concentrated in vacuo to the residual bromhydrin. This was then stirred and refluxed for 3 hours with 35 g. of standard Raney nickel and 350 cc. of ethanol. The mixture was filtered through a bed of filter-aid and concentrated in vacuo to a crystalline residue. Crystallization from acetone afforded pregnane-3α,17α,21-triol-11,20-dione 21-monoacetate, M. P. 227°.

*Anal.*—Calcd. for $C_{23}H_{34}O_6$: C, 67.96; H, 8.43. Found: C, 67.91; H, 8.58.

EXAMPLE IX

*Preparation of pregnane-3α,17α-diol-11,20-dione 3-monoacetate*

A solution of 60 g. of 16,17-oxido-pregnan-3α-ol-11,20-dione acetate in 300 cc. of glacial acetic acid was cooled to 15° and treated with a solution of 60 cc. of 32% hydrobromic acid in acetic acid. The reaction mixture was held at 20° for 15 minutes, whereupon the crystalline bromhydrin which separated was filtered and washed with ether. After drying the bromhydrin in vacuo with minimum heating during several minutes, it was stirred and refluxed for 3½ hours with 240 g. of standard Raney nickel in 2100 cc. of ethanol. The mixture was filtered through a bed of filter-aid, concentrated to low volume and crystallized from aqueous ethanol. There was obtained 45.8 g. of pregnane-3α,17α-diol-11,20-dione 3-monoacetate, M. P. 202°. Additional material can be obtained from the mother liquor.

EXAMPLE X

*Preparation of pregnane-3α,17α, 21-triol-11,20-dione 21-monoacetate*

A solution of 72 g. of pregnane-3α,17α-diol-11,20-dione 3-monoacetate in 720 cc. of acetic acid at 30° was treated with 7.2 cc. of 32% HBr in acetic acid and a solution of 31 g. of bromine in 320 cc. of acetic acid during a 5-minute period. After cooling and filtering, there was obtained 62.5 g. of the 21-bromo derivative, M. P. 235°. Recrystallization raised the melting point to 245°.

*Anal.*—Calcd. for $C_{23}H_{32}O_5Br$: C, 58.97; H, 6.89. Found: C, 58.85; H, 7.17.

The filtrate was dehalogenated with zinc dust, diluted with water and extracted with ether. The ethereal solution, upon concentration, yielded a recovery of 15.5 g. of starting material, M. P. 201–202°. The 62.5 g. of 21-bromo derivative was hydrolyzed by stirring with a mixture of 500 cc. of benzene and 1500 cc. of methanol containing 39 g. of anhydrous HBr for 8 hours. The hydrolysis mixture was diluted with ether and washed with water to neutrality and then concentrated in vacuo to a totally crystalline residue. The thoroughly dried 3-hydroxy-21-bromo derivative was dissolved in 1 liter of dry acetone and refluxed for 5 hours with 100 g. of anhydrous potassium acetate. The mixture was concentrated, then diluted with water and filtered. The dried crude 21-monoacetate, upon crystallization from ethyl acetate, afforded 45 g., M. P. 213–216°. Recrystallization from acetone or ethyl acetate raised the melting point to 227° - pregnane - 3α,17α,21 - triol - 11,20 - dione 21-monoacetate.

EXAMPLE XI

*Oxidation of 21-bromopregnane-3α,17α-diol-11,20-dione*

A slurry of 5.0 g. of 21-bromopregnane-3α,17α-diol-11,20-dione in 100 ml. of 90% acetic acid was stirred at 25° C. while a solution of 1.4 g. of chromic acid in 28 ml. of 50% acetic acid was added dropwise during twenty minutes. The starting material all dissolved during this addition. The product was promptly crystallized by portionwise addition of water and scratching the sides of the flask, a total of 250 ml. of water being used. The crystals were separated by filtration and dried, yielding 4.3 g. of 21 - bromopregnan - 17α - ol - 3,11,20 - trione of melting point 214° C., with decomposition.

EXAMPLE XII

*Preparation of dihydrocortisone acetate*

A mixture of 3.0 g. of 21-bromopregnan-17α-ol-3,11,20-trione, 50 ml. of anhydrous acetone and 6 g. of anhydrous potassium acetate flakes was heated under reflux for ninety minutes, and then about 40 ml. of acetone was removed by distillation. Water was added to the residue to dissolve the salt and to crystallize the product. The dihydrocortisone acetate was separated by filtration and washed with water, yielding 2.6 g. of crude white flakes of melting point 218–222° C., with slight softening at 210° C. Recrystallization from aqueous acetic acid raised the melting point to 230° C.

*Anal.*—Calcd. for $C_{23}H_{32}O_6$: C, 68.28; H, 7.98. Found: C, 68.00; H, 8.00.

EXAMPLE XIII

*Preparation of 16,17-oxidopregnane-3α,21-diol-11,20-dione 21-monoacetate*

A solution of 1.0 g. of 16-oxido-11-ketopregnanolone in 5 cc. of chloroform was treated with a solution of 0.3 g. of anhydrous HBr in chloroform at 30° and followed by 0.5 g. of bromine in 5 cc. of chloroform added dropwise. Allowed to stand at 35° for 5 minutes to complete the reaction. The solvent was removed in vacuo and the dried residue was dissolved in 30 cc. of dry acetone and refluxed for 4½ hours with 4 g. of anhydrous potassium acetate. Concentrated to low volume and diluted with water and filtered. The dried crude product was crystallized from ethanol and afforded 0.5 g. of 16,17-oxidopregnane-3α,21-diol-11,20-dione 21 - monoacetate, M. P. 227°.

EXAMPLE XIV

*Preparation of pregnane-3α,17α,21-triol-11,20-dione 21-monoacetate*

A solution of 5.0 g. of pregnane-3α,17α-diol-11,20-dione 3-monoacetate in 200 cc. of methanol was refluxed for 1½ hours with a solution of 5 g. of potassium bicarbonate in 15 cc. of water. 75 cc. of water was added and concentrated in vacuo to a crystalline slush and cooled. Filtration afforded 4.2 g. of the free diol, M. P. 201°. A solution of 1.74 g. of the 3α,17α-diol in 17 cc. of chloroform was treated at room temperature with a few drops of dry HBr in chloroform and followed dropwise with a solution of 0.84 g. of bromine in 5 cc. of chloroform during 10 minutes. The solution was concentrated in vacuo to residue. The dried 21-bromo derivative was dissolved in 35 cc. of dry acetone and refluxed for 4½ hours with 5 g. of anhydrous potassium acetate. Concentrated and diluted with water and filtered. The dried crude product, upon crystallization from ethyl acetate, afforded 1.0 g. of pregnane-3α,17α,21-triol-11,20-dione 21-monoacetate, M. P. 216°.

EXAMPLE XV

*Preparation of dihydrocortisone acetate*

In a one-liter Erlenmeyer flask, 10 g. of pregnane-3,17,21-triol-11,20-dione 21-monoacetate is dissolved in 180 ml. of 90% acetic acid by warming to a clear solution and then cooling to 25° C. An oxidizing mixture of 2.40 g. of chromic acid, 24 ml. of water and 24 ml. of acetic acid is added dropwise with stirring or swirling during five minutes. The resulting brown solution is held at 25–27° C. for 25 minutes longer, and then 150 ml. of water is added, with seeding, to cause crystallization. During the next fifteen minutes, additional water is added in small portions until a volume of 750 ml. is reached. This mixture is cooled at about 10° C. for about an hour and then filtered and washed with water.

The dried product is 9.0 g. of melting point 223–225° crystals. The optical rotation should be +80±2° in acetone.

For recrystallization, this product is dissolved in 54 ml., six parts, of hot acetic acid, filtered, if necessary, to clarify, and then diluted with 54 ml. of hot distilled water. The water can be added rapidly in a thin stream so that no precipitation occurs. The product crystallizes from the hot solution in needles or plates which melt between 228° and 231° C. It is filtered after one-half hour cooling in tap water.

The yield is 8.2–8.5 g., first crop, plus 0.3 g., M. P. 223–225°, which is obtained by further watering and cooling the mother liquor. The optical rotation of the product should be +81°±2° in acetone.

EXAMPLE XVI

*Preparation of 16,17-oxido-4-pregnen-21-ol-3,11,20-trione acetate*

A solution of 1.005 g. of 16,17-oxidopregnan-21-ol-3,11,20-trione acetate in 50 cc. of acetic acid was treated with 3.563 cc. of 0.75 N hydrogen bromide in acetic acid. This quantity of HBr is sufficient to convert the oxido group into a bromhydrin and allow a certain amount for catalysis of bromination. The solution was then treated dropwise, with stirring, with a solution of 0.205 g. of dry sodium acetate in 4.63 cc. of 1.08 N bromine in acetic acid. It was then diluted with water and extracted with chloroform. The chloroform layer was washed with water, dilute sodium bicarbonate solution, and with water containing one molar equivalent of sodium hydroxide in dilute solution (this solution is shaken with the chloroform phase until the alkali has practically disappeared from the aqueous phase). After further washing with water and drying, the chloroform solution was concentrated in vacuo to a pale yellow residue.

The crude product was dissolved in a mixture of 38 cc. of chloroform and 51 cc. of acetic acid. After the addition of 0.307 g. of dry sodium acetate and 0.544 g. of 2,4-dinitrophenylhydrazine, carbon dioxide was bubbled through the mixture for one hour. The vessel was then sealed off retaining a $CO_2$ atmosphere and allowed to stand for fifteen hours at room temperature. The orange solution was then concentrated in vacuo at 40–60° C. to a volume of about 12 cc. Chloroform (50 cc.) and 80% aqueous pyruvic acid (12.5 cc.) were added. The resulting solution was blanketed with $CO_2$ and stored at 45° C. for forty-eight hours. The solution was concentrated at 45° C. in vacuo to a small volume, diluted with cholorform, and filtered to remove the solid hydrazone of pyruvic acid. The filtrate was washed with water, dilute sodium bicarbonate solution, water and dried. Concentration of the chloroform solution gave an orange amorphous residue which was dissolved in hot acetone and treated with decolorizing charcoal. The pale yellow residue remaining after removal of solvent from the decolorized acetone solution was purified by chromatography and crystallization. The product showed an absorption pattern in the ultraviolet which is typical of 3-keto-$\Delta^4$-steroids (maximum at 239 m$\mu$).

By treatment of the described product, 16,17-oxido-4-pregnen-21-ol-2,11,20-trione acetate, with HBr in acetic acid and removal of halogen from the resulting bromhydrin with Raney nickel, there was obtained cortisone acetate as described in Example VII.

It is thus seen that applicants have provided a novel process useful in the production of cortisone acetate. If cortisone itself is desired, instead of the acetate, it may be easily prepared by a simple hydrolysis of the acetate.

In the following claims it is to be understood that the order of recitation of the various reactions is not determinative of the order in which they may be carried out, and that the various reactions may be carried out in any order subject to the limitations, express or necessarily implied, contained therein.

We claim:

1. The process of producing 21-acyl derivatives of cortisone from 16,17-oxidopregnan-3α-ol-11,20-dione which comprises converting the oxido group to an α-bromhydrin group by treatment with HBr, reductively removing the bromine thus introduced by treatment with Raney nickel, introducing a 21-bromo group by treatment with bromine, replacing the 21-bromo group with an acyloxy group by treatment with a metal salt of a carboxylic acid, converting the 3-OH group to a keto group by oxidation with chromic acid under conditions minimizing contact of the 3-keto compound initially formed with the oxidizing medium and forming a double bond in the 4,5-position by first introducing a bromo group in the 4-position by bromination and then treating with a dehydrobrominating agent to remove the elements of HBr, said process being further characterized in that (1) the bromination to introduce the 21-bromo group is carried out on a compound containing a 17α-hydroxy group, (2) the oxidation of the 3-OH group is carried out subsequent to the introduction of the 21-bromo group, and (3) the steps leading to the formation of the 4,5-double bond are carried out subsequent to the formation of the 21-acyloxy group and the 3-keto group.

2. The process of claim 1 in which the 21-bromo group is introduced by bromination of the bromhydrin, the oxido group being subsequently restored by treatment with an alkaline medium, after which the oxido group is again opened up with HBr and the 16-bromo group reductively removed with Raney nickel.

3. The process of claim 1 in which the metal salt is potassium acetate.

4. The process of claim 1 in which the 16-bromo group is removed prior to the introduction of the 21-bromo group.

5. The process of claim 1 in which the treatment with Raney nickel to remove the 16-bromo group is carried out prior to the oxidation of the 3-OH group to a keto group.

6. The process of claim 5 in which the treatment with Raney nickel is also prior to the introduction of the 21-bromo group.

7. The process of claim 1 in which the treatment with Raney nickel to remove the 16-bromo group is carried out subsequent to the oxidation of the 3-OH group to a keto group.

8. The process for producing cortisone acetate which comprises the steps of first treating 16-pregnen-3α-ol-11,20-dione with alkaline hydrogen peroxide, converting the oxido group to an α-bromhydrin group by treatment with HBr, reductively removing the bromine thus introduced by treatment with Raney nickel, introducing a 21-bromo group by treatment with bromine, replacing the 21-bromo group with an acyloxy group by treatment with a metal salt of a carboxylic acid, converting the 3-OH group to a keto group by oxidation with a chromic acid under conditions minimizing contact of the 3-keto compound initially formed with the oxidizing medium, and forming a double bond in the 4,5-position by first introducing a bromo group in the 4-position by bromination and then treating with a dehydrobrominating agent to remove the elements of HBr, said process being further characterized in that (1) the bromination to introduce the 21-bromo group is carried out on a compound containing a 17α-hydroxy group, (2) the oxidation of the 3-OH group is carried out subsequent to the introduc-

13 tion of the 21-bromo group, and (3) the steps leading to the introduction of the 4,5-double bond are carried out subsequent to the formation of the 21-acyloxy group and the 3-keto group.

9. The process of producing a 21-acyloxy derivative of cortisone from 16,17-oxidopregnan-3α-ol-11,20-dione which comprises first treating with an acylating agent to form a 3α-acyloxy group, then converting the oxido group to an α-bromhydrin group by treatment with HBr, treating the thus formed bromhydrin with bromine to introduce a 21-bromo group, then hydrolyzing to re-form the 3α-hydroxy group, then treating the resulting 16,21-dibromo-pregnane-3α,17α-diol-11,20-dione with a metal salt of a carboxylic acid to replace the 21-bromo group by an acyloxy group to form the 21-acyloxy derivative of 16,17-oxidopregnane-3α,21-diol-11,20-dione, then converting the 3-OH group to a keto group by oxidation with chromic acid under conditions minimizing contact of the initially formed 16,17-oxidopregnan-21-ol-3,11,20-trione ester with the oxidizing medium, then treating with HBr to form a bromhydrin, then reductively removing the 16-bromo group thus introduced by treatment with Raney nickel, then introducing a bromine atom in the 4-position by bromination and then treating with a dehydrobrominating agent to remove the elements of HBr.

10. The process of producing cortisone acetate which comprises the steps of treating 16,17-oxidopregnan-21-ol-3,11,20-trione acetate successively with HBr, bromine and to a mild alkaline treatment to form 4-bromo-16,17-oxidopregnan-21-ol-3,11,20-trione acetate, then treating with a dehydrohalogenating agent to form a 4,5-double bond, then treating with HBr to form a bromhydrin, and then reductively removing the resulting 16-bromo group by treatment with Raney nickel to form cortisone acetate.

11. The process of producing cortisone acetate which comprises treating 16,17-oxidopregnane-3α-21-diol-11,20-dione 21-monoacetate with HBr to form a bromhydrin, treating the resulting bromhydrin with Raney nickel to reductively remove the 16-bromo group, then converting the 3-OH group to a keto group by oxidation with chromic acid under conditions minimizing contact of the initially formed pregnane-17α-21-diol-3,11,20-trione 21-monoacetate with the oxidizing medium, then introducing a 4-bromo group by bromination, and then treating with a dehydrohalogenating agent to remove the elements of HBr.

12. The process of producing cortisone acetate which comprises treating an ester of 16,17-oxidopregnan-3α-ol-11,20-dione with HBr to form a bromhydrin, treating the resulting bromhydrin with Raney nickel to reductively remove the 16-bromo group, then treating with bromine to introduce a 21-bromo group, then hydrolyzing to form 21-bromopregnane-3α,17α-diol-11,20-dione, then treating with an alkali metal acetate to replace the 21-bromo group by an acetoxy group, then converting the 3-OH group to a keto group by oxidation with chromic acid under conditions minimizing contact of the initially formed pregnane-17α,21-diol-3,11,20-trione 21-monoacetate with the oxidizing medium, then introducing a 4-bromo group by bromination, and then treating with a dehydrohalogenating agent to remove the elements of HBr.

13. The process of producing cortisone acetate from 21-bromopregnane-3α,17α-diol-11,20-dione, the steps comprising replacing the 21-bromo group with an acetoxy group by treatment with an alkali metal acetate, converting the 3-OH group to a keto group by oxidation with chromic acid under conditions minimizing contact of the initially formed 3-keto compound with the oxidizing agent to form pregnane-17α,21-diol-3,11,20-trione 21-monoacetate, and then forming a double bond in the 4,5-position by first introducing a 4-bromo group by bromination and then treating with a dehydrobrominating agent to remove the elements of HBr.

14. The process of producing cortisone acetate which comprises treating 16,17-oxidopregnan-3α-ol-11,20-dione with HBr to form a bromhydrin, treating the resulting bromhydrin with bromine under non-acylating conditions to form 16,21-dibromopregnane-3α,17α-diol-11,20-dione, and thereafter: converting the 3-OH group to a keto group by oxidation with chromic acid under conditions minimizing contact of the initially formed 3-keto compound with the oxidizing agent, replacing the 21-bromo group with an acetoxy group prior to the reductive removal of the 16-bromo group of the bromhydrin group by Raney nickel, by treatment with an alkali metal acetate, converting the bromhydrin group to an oxido group by treatment in an alkaline medium, subsequently opening up the oxido group by treatment with HBr to re-form the bromhydrin group, reductively removing the 16-bromo group from the re-formed bromhydrin group by treatment with Raney nickel, and forming a double bond in the 4,5-position by first introducing a bromo group in the 4-position by bromination and then treating with a dehydrobrominating agent to remove the elements of HBr, said process being further characterized in that the first step leading to the formation of the 4,5-double bond is carried out on a bromine-free compound subsequent to the formation of the 21-acetoxy group and the 3-keto group.

15. The process of claim 14 in which the treatment with alkali metal acetate to introduce the 21-acetoxy group is carried out on a bromhydrin and provides the alkaline conditions for conversion of the bromhydrin to the oxide.

16. The process which comprises treating a compound of the general formula

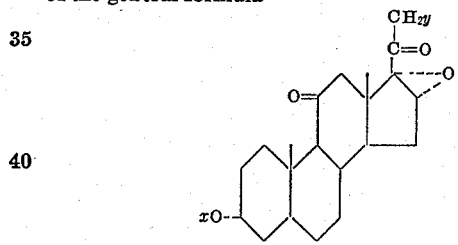

in which x is a group selected from the class consisting of hydrogen and acyl groups, and y is a group selected from the class consisting of hydrogen and acyloxy groups, with HBr, and removing the 16-bromo group thus introduced by treatment by Raney nickel.

17. 16,17-oxidopregnan-3α-ol-11,20-dione acetate.
18. 16,17 - oxidopregnane - 3α,21 - diol - 11,20 - dione 21-monoacetate.
19. 16,17-oxidopregnan-21-ol-3,11,20-trione acetate.
20. 16,17-oxido-4-pregnen-21-ol-3,11,20-trione acetate.
21. 21-bromo-16,17-oxidopregnan-3α-ol,11,20-dione.
22. 21-bromo-16,17-oxidopregnane-3,11,20-trione.
23. 21-bromopregnane-3α,17α-diol-11,20-dione.
24. 16-bromopregnane-3α,17α-diol-11,20-dione and the 3-acetate thereof.
25. 16-bromopregnane-3α,17α,21-triol-11,20-dione - 21-acetate.
26. 16-bromopregnane-17α,21-diol-3,11,20 - trione - 21-acetate.
27. 16-bromo-4-pregnene-17α,21-diol-3,11,20-trione-21-acetate.

28. The process which comprises treating a compound of the general formula

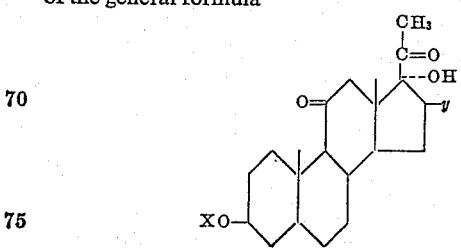

in which X is selected from the group consisting of hydrogen and acyl groups, and y is selected from the class consisting of hydrogen and bromine, with bromine to form the corresponding 21-bromo derivative.

29. The process for producing a 21-acyloxy derivative of cortisone which comprises subjecting 16,21-dibromopregnane-3α,17α-diol-11,20-dione to a mildly alkaline treatment to convert the α-bromo hydrin group to an oxido group, then converting the 3-OH group of the resulting oxido compound to a keto group by oxidation with chromic acid under conditions minimizing contact of the 3-keto group initially formed with the oxidizing medium, then treating the resulting 3-keto compound with a metal salt of a carboxylic acid to replace the 21-bromo group by an acyloxy group, and thereafter (1) converting the oxido group to a 17α-hydroxy group by first treating with HBr to form a bromhydrin followed by reductive removal of the bromine by treatment with Raney nickel, and (2) introducing a double bond in the 4,5-position by first introducing a bromine group in the 4-position by bromination and then treating with a dehydrobrominating agent to remove the elements of HBr.

References Cited in the file of this patent

UNITED STATES PATENTS

| | | |
|---|---|---|
| 2,401,775 | Reichstein | June 11, 1946 |
| 2,492,193 | Sarett | Dec. 27, 1949 |
| 2,541,105 | Sarett | Feb. 13, 1951 |